T. C. ARCHER.
FOUR WHEEL DRIVE FOR VEHICLES.
APPLICATION FILED OCT. 16, 1914. RENEWED JULY 29, 1916.
1,201,232.
Patented Oct. 17, 1916.
4 SHEETS—SHEET 1.
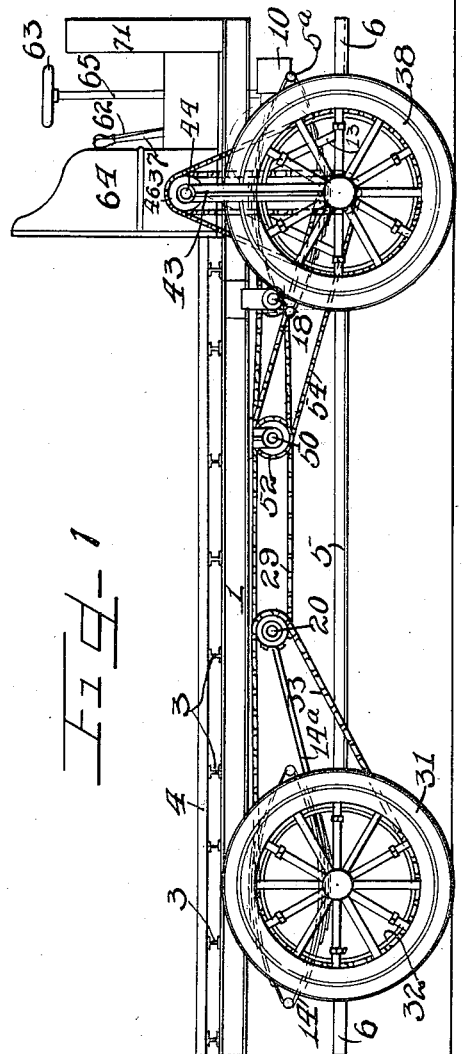
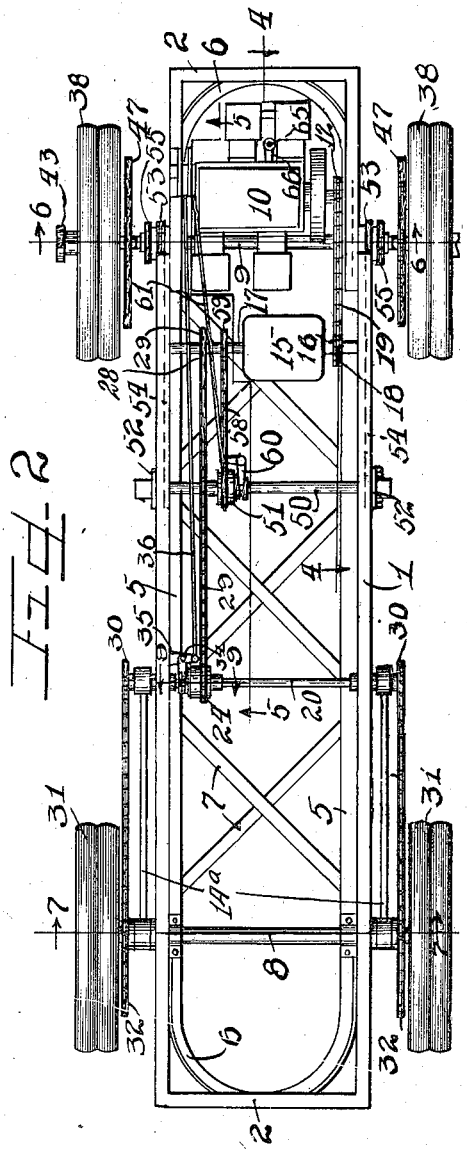

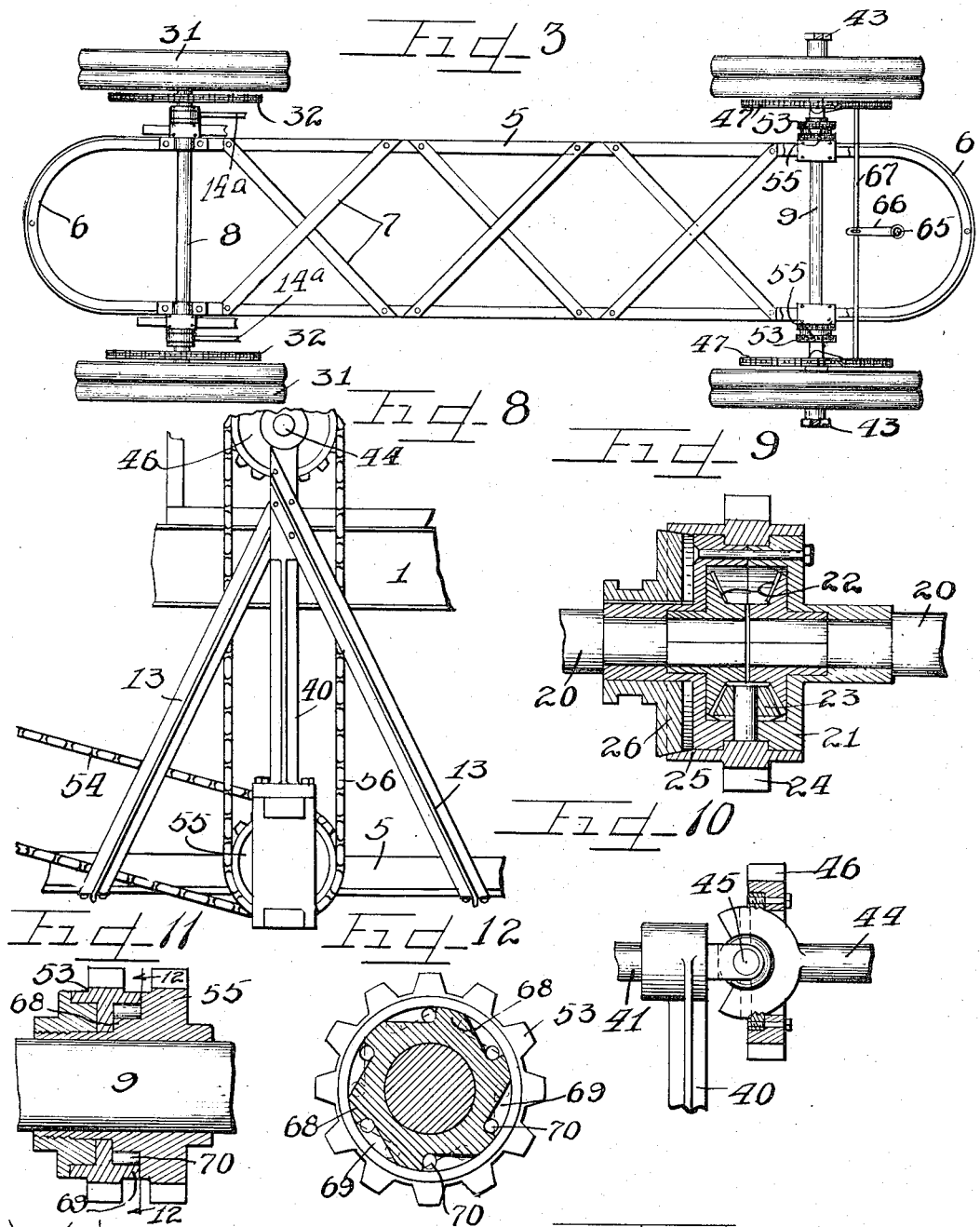

T. C. ARCHER.
FOUR WHEEL DRIVE FOR VEHICLES.
APPLICATION FILED OCT. 16, 1914. RENEWED JULY 29, 1916.
1,201,232.
Patented Oct. 17, 1916.
4 SHEETS—SHEET 3.
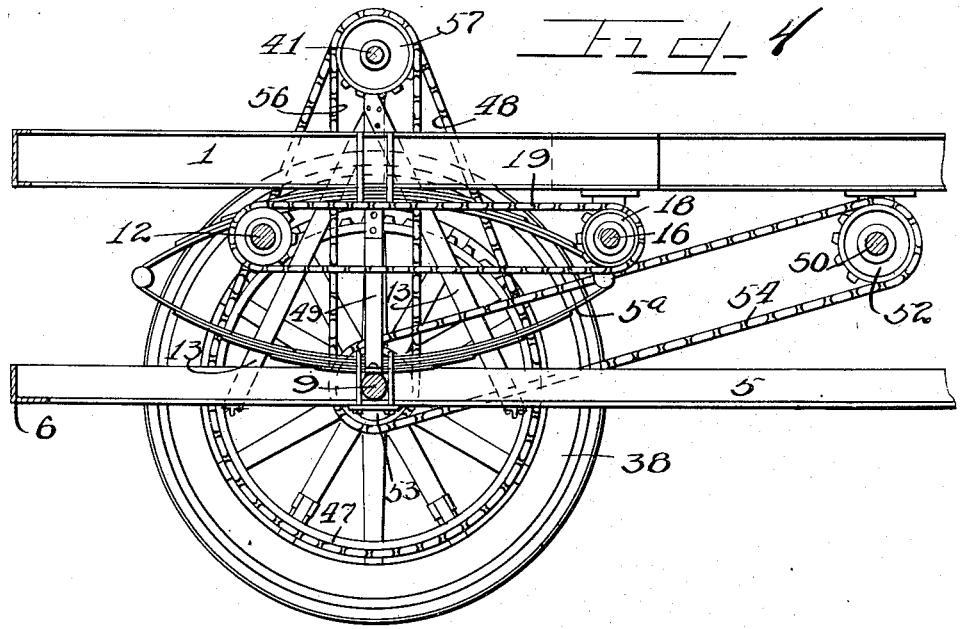
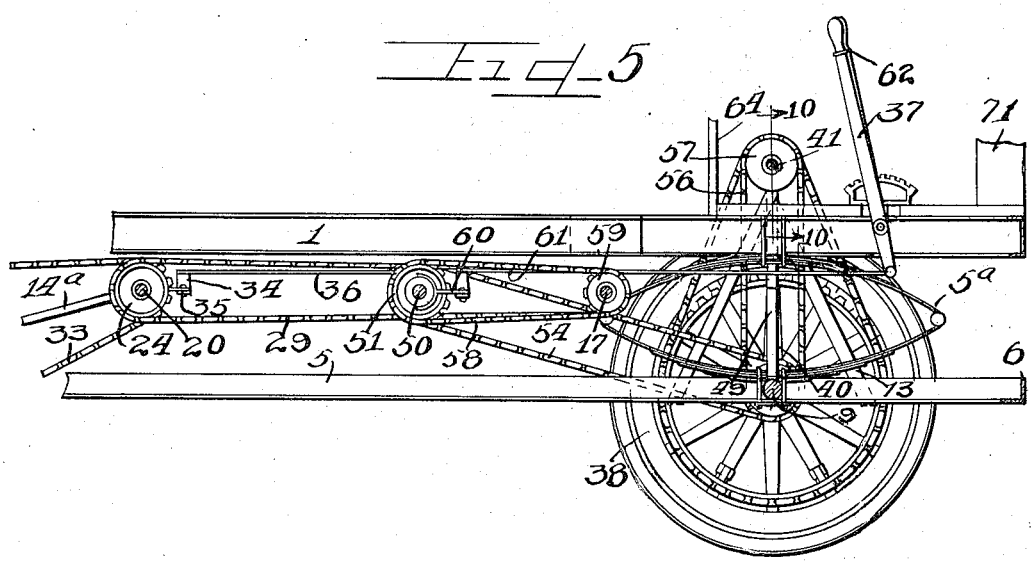
Witnesses
J. W. Angell
Charles W. Tilly Jr. by
Inventor
Thomas C. Archer
Charles W. Tilly
Atty.

T. C. ARCHER.
FOUR WHEEL DRIVE FOR VEHICLES.
APPLICATION FILED OCT. 16, 1914. RENEWED JULY 29, 1916.
1,201,232.
Patented Oct. 17, 1916.
4 SHEETS—SHEET 4.
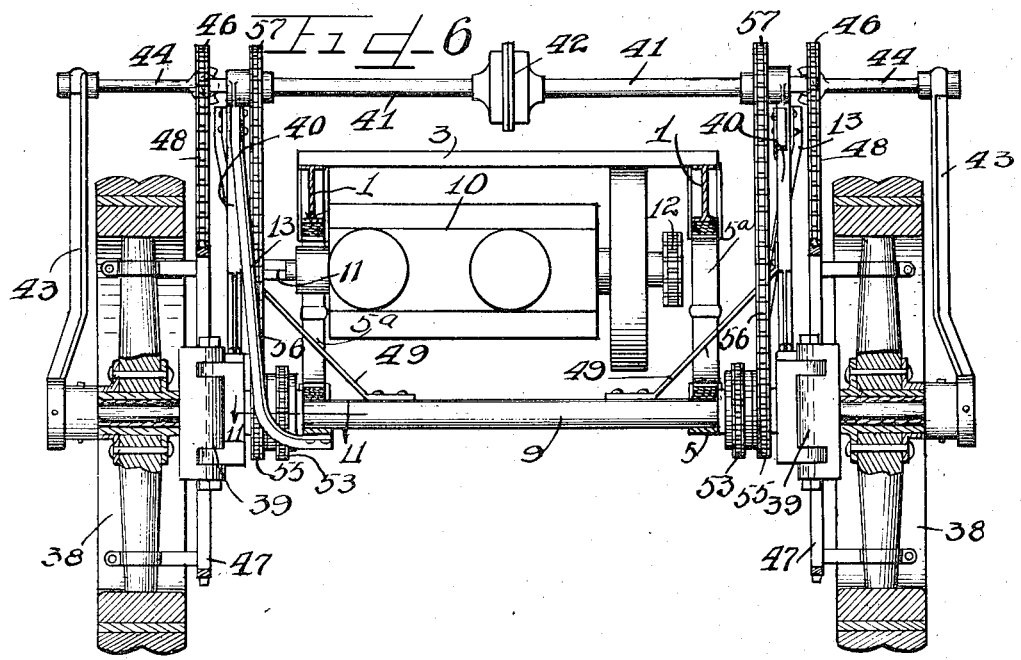
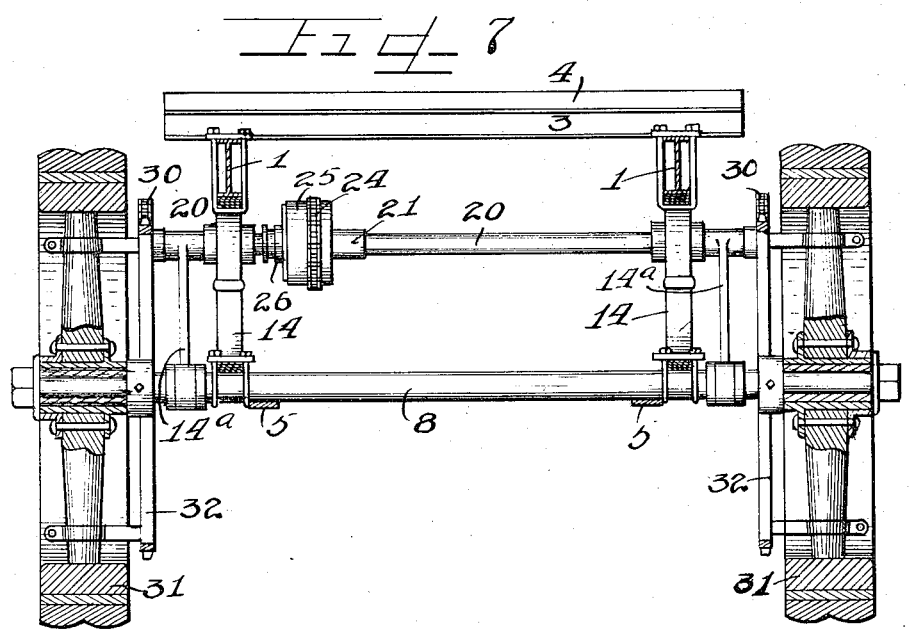

UNITED STATES PATENT OFFICE.

THOMAS C. ARCHER, OF GREAT FALLS, MONTANA.

FOUR-WHEEL DRIVE FOR VEHICLES.

1,201,232.            Specification of Letters Patent.      Patented Oct. 17, 1916.

Application filed October 16, 1914, Serial No. 866,902. Renewed July 29, 1916. Serial No. 112,190.

*To all whom it may concern:*

Be it known that I, THOMAS C. ARCHER, a citizen of the United States, and a resident of the city of Great Falls, in the county of Cascade and State of Montana, have invented certain new and useful Improvements in Four-Wheel Drives for Vehicles; and I do hereby declare that the following is a full, clear, and exact description of the same, reference being had to the accompanying drawings, and to the numerals of reference marked thereon, which form a part of this specification.

The inefficiency of the ordinary two wheel rear drive has demonstrated itself from time to time, more particularly where trucks for heavy hauling have been used, than with pleasure cars. It is not uncommon for one of the rear driving wheels of a truck to sink into a mudhole from which it can only be removed by means other than the motive power of the truck, for the reason that the wheel in the mudhole receives all of the drive, due to the differential, the other wheel remaining at rest. Consequently, since no effective traction can be obtained by the wheel in the mudhole it is not possible for the vehicle to remove itself under its own power. The efficiency of a vehicle capable of driving through the front wheels in such an instance is readily apparent.

The four wheel drive is an ideal drive for propelling heavy vehicles, particularly across rough or mountainous country, and owing to the even distribution of power, the vehicle in fact is made more easy riding than the usual type of two wheel driven motor car.

It is an object of this invention to construct a four wheel drive vehicle, each of the wheels of which is driven differentially and certain of the wheels of which may be turned for steering purposes without disconnecting the drive therefrom.

It is also an object of this invention to construct a motor driven vehicle wherein the drive from a unit power plant is transmitted to various countershafts and from said countershafts to the wheels of the vehicle in a manner permitting differential rotation of the various wheels and turning of certain wheels thereof for steering purposes.

It is also an object of this invention to construct a four wheel drive vehicle wherein the power plant is mounted at the forward end and above the front wheels of the vehicle and connected to drive a plurality of countershafts provided with differential releasable clutch mechanisms which permit differential rotation of the wheels and disconnection of the drive therefrom by controls situated at the operator's station.

It is furthermore an important object of this invention to construct a four wheel drive vehicle wherein a jackshaft is journaled above the front axle, comprising shaft sections connected by universal joints, and driving to each of the front wheels, permitting turning thereof during driving.

It is finally an object of this invention to construct a four wheel drive vehicle embodying a number of novel features of construction, and yet of the greatest simplicity of design and well adapted for use in pleasure cars or motor trucks.

The invention (in a preferred form) is illustrated in the drawings and hereinafter more fully described.

In the drawings, Figure 1 is a side elevation of a motor truck embodying the principles of my invention. Fig. 2 is a top plan view thereof, with the body and front wheel jackshaft omitted. Fig. 3 is a view similar to Fig. 2, but with the upper frame on which the motor and driving mechanisms are supported, omitted. Fig. 4 is a detail section taken on line 4—4 of Fig. 2. Fig. 5 is a detail section taken on line 5—5 of Fig. 2, with parts omitted. Fig. 6 is a detail section taken on line 6—6 of Fig. 2, with parts shown in elevation. Fig. 7 is a similar section taken on line 7—7 of Fig. 2. Fig. 8 is a detail illustrating the connection between the upper and lower driving elements at the forward end of the vehicle. Fig. 9 is a detail section of the friction clutch differential mechanism taken on line 9—9 of Fig. 2. Fig. 10 is a detail section of the universal joint and driving sprocket of the front wheel jackshaft, taken on line 10—10 of Fig. 5. Fig. 11 is a detail section of a possible adaptation of a differential clutch mechanism for the front wheels, taken on line 11—11 of Fig. 6. Fig. 12 is a section taken on line 12—12 of Fig. 11.

As shown in the drawings, the main or upper frame of the vehicle consists of side sill channel members 1, connected at their ends by end sills 2, and as shown in Fig. 1, with a plurality of I-beams 3, laid transversely thereacross and riveted thereto upon which the bed or floor 4, of the body is laid The main frame consists, as clearly shown in Fig. 2, of two sections, the forward end being smaller than the other section. A lower or subframe 5, is provided constructed of members of angle section steel, reinforced with wood between the axles, the front and rear end members of which are curved, as indicated by the reference numerals 6, and with diagonal spring members 7, of spring steel riveted to one another and to the side sills of said subframe acting to reinforce and strengthen the same. Said subframe 5, at the rear end is rigidly secured to a stationary axle 8, and at its front end is similarly connected to a stationary front axle 9.

The gas engine, denoted as a whole by the reference numeral 10, may be of any type desired, but is shown as a horizontal motor, having four cylinders, and is mounted at the front end of the main frame 1, hung slightly below the sill members thereof, so that the crankshaft extends transversely of the vehicle. Accordingly one end of said crankshaft is squared, as indicated by the reference numeral 11, in Fig. 6, to permit attachment thereto of a crank for starting, and the other end is provided with a sprocket wheel 12. The forward end of said main frame 1, is attached to and rests upon springs 5ª, of any make or pattern, these springs in turn resting upon and attached to the front axle. At the rear end of the vehicle preferably the same type or similar springs 14, are attached in the same manner to the rear axle 8, and are connected beneath the side sills of the main frame 1, thus resiliently supporting the frame thereon. In order to maintain the main frame in proper longitudinal position and relieve the springs of longitudinal stress, strut rods 14ª, are connected to the rear axle 8, and to the extended ends of the shaft 20, and of course provision is made at all connections of the parts for adjustment, such as taking up any slack in the driving chains or alining the shafting. Also mounted transversely across the main frame 1, is a transmission casing 15, containing the various gears for different speeds of the vehicle, and the respective driving and driven shafts which are denoted by the reference numerals 16 and 17. A sprocket 18, is mounted upon the shaft section 16, and trained thereabout is a chain 19, which is also trained about the sprocket wheel 12, on the crankshaft. A clutch (not shown) of any conventional design is connected between the driven sprocket 18, and the power shaft 16, of the transmission.

A jackshaft 20, is journaled near the rear end of said main frame 1, in suitable bearings provided for the purpose, said shaft consisting of two sections, the squared ends of which extend within a cage 21, and are there each provided with bevel gears 22, forming a part of a differential mechanism. Said cage 21, is provided with a number of small idler bevel pinions 23, which engage each of the bevel gears 22, and act to rotate the same when said cage 21, is rotated Journaled on the exterior of said cage 21, is a sprocket wheel 24, provided with an extended female clutch member 25, and a conical male clutch member 26, is feathered upon the hub extension of said cage 21, and is adapted to slide into engagement with the female member to engage said cage to the sprocket wheel. Another sprocket wheel 28, is secured upon said shaft section 17, of the transmission, and trained thereabout and about said sprocket wheel 24, is a driving chain 29. Secured upon the outer end of said sectional shaft 20, are sprocket wheels 30, and journaled upon the outer ends of the rear axle 8, are driving wheels 31, each having relatively large annular gears 32, secured to the spokes of the wheel on the inner side thereof, and with a chain 33, trained therearound and around the respective sprocket wheels 30. For the purpose of actuating the male clutch member 26, on said sectional shaft 20, whereby the drive may be disconnected from said rear wheels 31, a bell crank lever 34, is pivoted on the bracket 35, with one arm of said crank engaging a groove in the hub of said male clutch member 26, and the other arm of said crank connected to a lever 36, which extends to the forward end of the machine and is there connected to an actuating lever 37, conveniently disposed for use by an operator.

The front wheels of the vehicle, which are denoted by the reference numerals 38, are connected upon the front axle 9, by means of steering knuckles 39, provided with stub axles on which said wheels are journaled, thus permitting said wheels to be turned for steering purposes. Consequently it is necessary to provide a driving means which transmits power to each of said front wheels independently of the angle thereof with respect to the vehicle, and for this purpose vertical bracket members 40, are mounted upon the stationary members of the steering knuckles 39, and at their upper ends afford bearings for shaft sections 41, the ends of which are journaled in any suitable housing 42, adapted to maintain said sections in alinement with one another and yet permit differential movement thereof. Connected upon the outer ends of the stub axles of said front wheels, are upright bracket members 43, each held in place by a pin passing therethrough and through the hub nut, which in turn is held in place by a pin passing therethrough and through the stub, said brackets at their upper ends affording bearings for shaft sections 44, said respective shaft sections 41 and 44, being connected to one another through a universal joint 45, with a sprocket wheel 46, secured upon that portion of the joint rigid with the shaft section 44. Secured upon the inner side of each of the front wheels 38, is an annular gear 47, which is bolted to the spokes of the wheel, and trained thereabout and about the respective sprockets 46, are chains 48. It is apparent therefore that as said front wheels are turned the shafts 44, and sprocket wheels 46, turn therewith, receiving the drive at any angle through the universal joint.

The inner bracket members 40, are stiffened by diagonal brace members 49, which are secured thereto and to the front axle 9, passing through the springs of the vehicle at a convenient angle, and also by diagonal braces 13, which are curved beneath and riveted to the sills of the subframe in a manner to permit convenient working of the vertical driving chain hereinafter described. For the purpose of differentially driving the respective shaft sections 41, a countershaft 50, is journaled in the main frame 1, and is provided with a differential clutch mechanism similar to that shown in Fig. 9, denoted as a whole by the reference numeral 51.

Secured upon the outer end of the shaft sections of said shaft 50, are sprocket wheels 52, and journaled upon the front axle member 9, are sprocket wheels 53, adapted to be driven from said sprockets 52, by means of chains 54. Each of said sprocket wheels 53, is connected to another sprocket wheel 55, adjacent thereto, and having trained thereabout a chain 56, which drives a sprocket wheel 57, secured upon one of the shaft sections 41. The sectional jackshaft 50, receives power at the differential clutch 51, by means of a chain 58, trained thereabout and about a sprocket wheel 59, upon the transmission shaft section 17. For the purpose of actuating the clutch of said differential clutch mechanism 51, a bell crank 60, is pivoted on the main frame, and is actuatable by a long rod or lever 61, leading to the forward end of the vehicle, and there connected to a hand lever 62, adjacent the lever 37. A notched segment is provided for each of said levers 37 and 62, which may be engaged by suitable latching mechanisms thereon to hold said levers in any one of a number of adjusted positions.

For the purpose of steering the vehicle a hand wheel 63, is mounted in front of an operator's seat 64, upon the upper end of a vertical shaft 65, journaled in the main frame, and at its lower end is provided with a slotted crank 66. The movable members of the steering knuckles 39, are connected by means of a horizontal rod 67, which is provided with a pin or upright extension engaging in the slotted crank or lever 66, so that rotation of the hand wheel 63, acts to shift said front wheels by means of said rod 67, simultaneously in either direction. However the conventional worm and gear steering mechanism now in wide use on all types of motor cars may be used if so desired.

If desired the gears 53 and 55, on the front axle 9, may be connected one to another, through a ratchet mechanism, as shown in Figs. 11 and 12, that is, with a number of teeth 68, formed on the gear 55, and with a number of angled projections 69, around the exterior of the gear 63, and with rollers 70, interposed therebetween, so that the gear 53, drives the gear 55, through said rollers. However, the gear 55, may overrun the gear 53, that is a differential movement may take place, as in coasting or rounding a corner, at such time the rollers 70, falling inwardly and out of engagement with the teeth. The lower or subframe 5, may be utilized in towing wagons or other vehicles, and also acts efficiently to rigidly brace the front and rear axles, maintaining the same in proper alinement.

The operation is as follows: The engine drives directly to the combined clutch and transmission element 15, no details of which are shown, but which may be constructed according to the best practice now in use, the shaft section 17, extending therefrom, serving to drive the countershafts 20 and 50, respectively, the former for the rear wheels of the vehicle and the latter for the front wheels. Each of said shafts 20 and 50, are sectional and provided with a differential mechanism, so that the rear wheels 31, are driven differentially, and the shaft sections 41, of the countershaft mounted above the front axle, are also driven differentially. Owing to the universal joint connection in said jackshaft sections 41 and 44, the driving sprockets 46, upon the shaft sections 44, turn in any direction together with the front wheels 38, so that the drive is communicated to said wheels regardless of their position.

I have omitted a number of features of construction which form a necessary adjunct of every motor car, but all of which are well known and therefore need no description or illustration, such as the brakes, fuel and spark control, and radiator connection, the radiator only being shown diagrammatically in Fig. 1, and designated by the reference numeral 71.

I am aware that various details of construction may be varied through a wide range without departing from the principles of this invention, and I therefore do not purpose limiting the patent granted otherwise than necessitated by the prior art.

I claim as my invention:

1. In a four wheel drive vehicle, a frame, wheels supporting said frame at the front and rear thereof, a power plant on said frame, driving connections between the power plant and the rear wheels of the vehicle, a sectional countershaft mounted above said front wheels, brackets mounted on the exterior of said front wheels and projecting upwardly therefrom, shaft sections journaled therein, universal joints connecting said shaft sections with said sectional countershaft, said shaft sections adapted to turn through any angle with said front wheels, a front axle mounted in said frame in alinement with the bearings of said front wheels, sprocket wheels thereon in driving connection with the power plant, other sprocket wheels connected with said first-mentioned sprocket wheels and in driving connection with said sectional countershaft, and driving connections between the shaft sections universally connected with said countershaft, and said front wheels.

2. In a four wheel drive vehicle, a frame, wheels supporting said frame at the front and rear thereof, a power plant on said frame, a shaft section driven from said power plant, a sectional jack-shaft driven differentially from said shaft section, connections for driving the rear wheels from the sections of said jack-shaft, a sectional countershaft also differentially driven from said shaft section, sprockets rotatable on the front axle and driven from said countershaft, main shaft sections mounted above said sprockets and driven therefrom, said shaft sections being differentially connected, outer shaft sections in alinement with and having universal connection with said main shaft sections, front wheels mounted on vertical pivots on said front axle, and connections between said outer shaft sections and wheels for driving the latter in any adjusted steering position.

In testimony whereof I have hereunto subscribed my name in the presence of two subscribing witnesses.

T. C. ARCHER.

Witnesses:
J. W. SPEER,
J. A. KAUFMAN.